Nov. 20, 1923.
O. H. HANSEN
1,474,820
PROCESS OF PRESERVING FOOD
Filed April 7, 1920
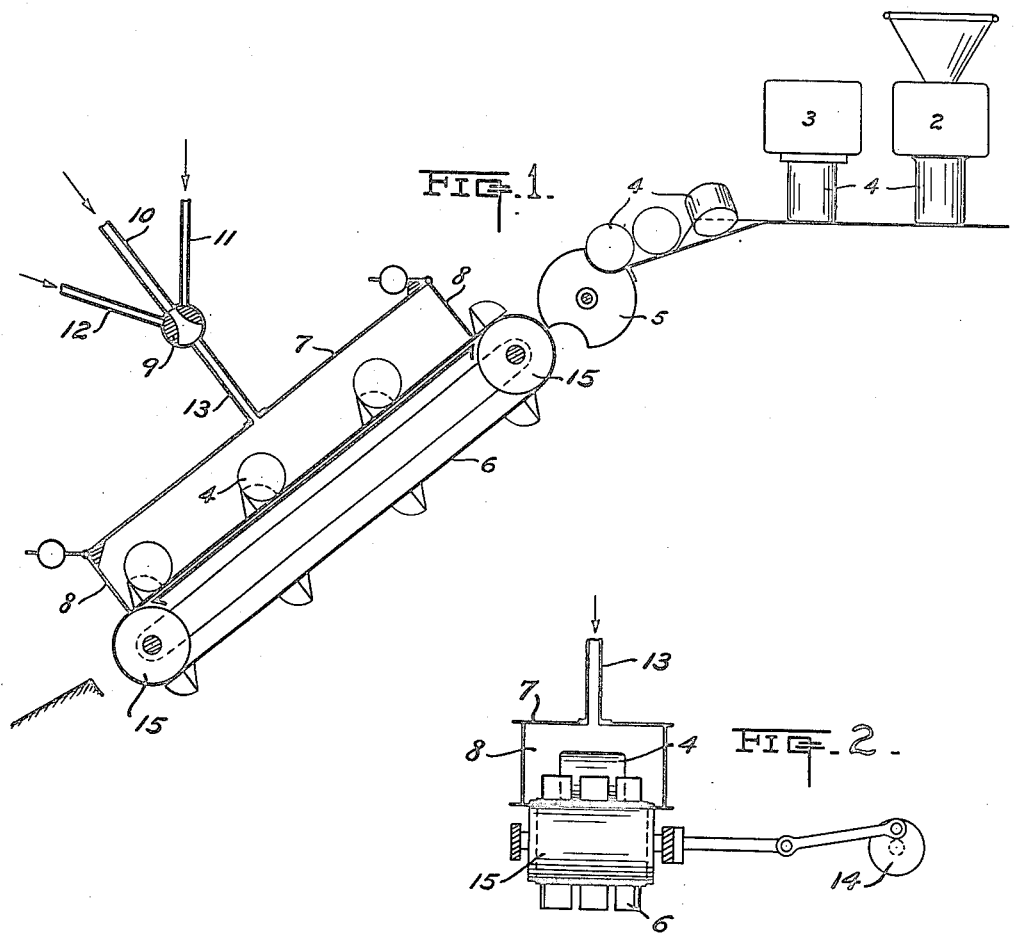
INVENTOR
O. H. Hansen
BY
W. H. Lieber
ATTORNEY.

Patented Nov. 20, 1923.

1,474,820

UNITED STATES PATENT OFFICE.

OSWALD H. HANSEN, OF PORT WASHINGTON, WISCONSIN, ASSIGNOR, BY DIRECT AND MESNE ASSIGNMENTS, TO HANSEN CANNING MACHINERY CORPORATION, A CORPORATION OF WISCONSIN.

PROCESS OF PRESERVING FOOD.

Application filed April 7, 1920. Serial No. 371,807.

*To all whom it may concern:*

Be it known that OSWALD H. HANSEN, a citizen of the United States, residing at Port Washington, in the county of Ozaukee and State of Wisconsin, has invented a certain new and useful Process of Preserving Food, of which the following is a specification.

This invention relates in general to an improved process of treating food to preserve the same, and relates more specifically to improvements in the art of cooking and sterilizing relatively small batches of food such as animal or vegetable matter, after they have been packed in containers such as metal cans.

An object of the invention is to provide a simple and efficient method of cooking and sterilizing food in order to preserve the same. Another object is to provide a process whereby canned food products may be rapidly, automatically and uniformly sterilized in order to destroy destructive and injurious bacteria therein.

The present commercial methods of cooking and sterilizing canned food products such as milk, peas, corn and the like, are all unsatisfactory because they are crude, cumbersome and inefficient. One method which has been practically universally adopted by the canners as being the most satisfactory, comprises the following general procedure. The successive cans after having been filled with the product to be treated, are hermetically sealed in closing machines. Upon delivery from the closing machines, the sealed cans are packed by hand into crates in which they are arranged in three or four superimposed layers. The loaded crates are then transferred by any suitable means such as an overhead trolley, to the cooking and sterilizing kettles which are ordinarily of sufficient capacity to hold three crates piled one upon the other. After a kettle has been filled, the cover thereof is clamped shut and live steam is admitted for a sufficient length of time to establish a uniform temperature of from 220 degrees to 240 degrees Fahrenheit. The temperature thus established is dependent upon the characteristics of the product being treated, some products requiring a lower temperature for cooking than others, but practically all products being unable to withstand a temperature above 240 degrees, without burning. After the product has been subjected to this temperature for a sufficient length of time to cook the same, the steam is turned off and the kettle is opened. The crates are then removed and transferred to cooling tanks which ordinarily contain water as a cooling medium. In the cooling tanks the cans are cooled sufficiently to stop the internal boiling action of the sealed product and to permit subsequent handling of the cans. The cooled cans are then removed from the crates by hand, thus completing the processing or preserving operation.

The above general process has been somewhat modified in some instances, in order to facilitate exploitation thereof, but none of these modifications have succeeded in entirely eliminating the objectionable human element involved, which prevents rapid and uniform treatment of the successive batches of canned product. There have been some attempts at eliminating this human element, by providing means for urging the cans in succession through a heated zone and subsequently through a cooling zone, but these attempts have failed because of the inability to maintain the temperatures necessary for efficient cooking and sterilization, and also because of improper application of heating and cooling media, which resulted in destruction of many cans and produced considerable waste of material.

There are various important factors to be considered in preserving food, batches of which have been packed in metallic containers. One of these is that some foods may be cooked by subjecting them to temperatures ranging from 220 to 240 degrees Fahrenheit, but will burn if subjected to an increase in temperature of 10 degrees above the cooking temperature, unless they are continuously agitated while subjected to the burning temperature. Some foods will not however withstand violent agitation for any great length of time, as such agitation will cause them to disintegrate thereby reducing their grade for commercial purposes. It is also an established fact that most efficient cooking results when the food is subjected to a relatively uniform temperature for a definite length of time. A temperature which will suffice for cooking, is not however sufficiently high to kill all destructive and injurious bacteria, it having been found that most foods should be subjected to a considerably higher temperature than that necessary for cooking, in order to effect complete sterilization. Most efficient sterilization is also obtained when all portions of the mass of food are subjected to the maximum sterilizing temperature. In applying relatively high sterilizing temperatures to foods packed in metallic containers, the relative frailty and inability of the sanitary type of can now universally employed in the industry, must be considered. These sanitary cans cannot be subjected to sudden and uneven variations in temperature or pressure after having been filled with product and sealed. The sanitary cans will withstand relatively sudden increases in temperature if uniformly applied, but such increases in temperature locally applied will cause stretching of the seams and consequent spoilage of the contents. All of these factors have heretofore hindered developement of the art of preserving canned food, with the result that the same general process with its numerous objections, has been retained by necessity for many years.

The present invention contemplates provision of a simple, automatic and efficient process of preserving canned food products, which will insure proper cooking and subsequent sterilization of such products and in which waste and spoilage are entirely eliminated. The invention contemplates improvements in the method of sterilizing canned food products, set forth in copending application Serial Number 261,791 filed November 9, 1918. This application relates to a process for subjecting all portions of a mass of food packed in a container, to a uniform temperature. The invention further contemplates improvements in the method of preserving canned food products, set forth in copending application Serial Number 270,004, filed January 7, 1919. This application relates to a process for automatically treating canned food products in order to produce uniform treatment thereof and to avoid manual handling of the packed containers.

A clear conception of the several steps constituting the present improved process of preserving food, may be had by referring to the following specification and to the drawing constituting a part thereof, in which like reference characters designate the same or similar parts in the several views.

Fig. 1 is a diagram illustrating apparatus for exploiting the improved process of preserving food.

Fig. 2 is a transverse section through the preserving retort and associated apparatus.

The metallic cans 4 after having been filled with food such as milk, peas, corn or the like by means of a filling machine 2, are sealed in a closing machine 3 which crimps the covers upon the successive filled containers. From the closing machine 3 the sealed containers or cans 4 are delivered by means of suitable conveying mechanism 5, 6, 15 into a retort 7. After the retort 7 has been suitably filled, the retort doors 8 are automatically closed. When the retort 7 has been closed, the cans 4 within the same may be agitated by means of mechanism 14 in order to cause the food within the cans 4 to circulate and to come in contact with the can walls. If such agitation is employed, it must not be sufficient to disintegrate the solid particles of the food, the degree of agitation being regulable by varying the speed of rotation of the agitating eccentric. A heating medium such as live steam may then be automatically gradually admitted from a source 10 past a control valve 9 and through the pipe 13 to the retort 7, the amount of steam admitted and the temperature established in the retort 7 being dependent upon the characteristics of the particular product being treated, and being automatically controllable in any suitable manner.

The food is subjected to this temperature for a sufficient length of time to thoroughly cook the product. After proper cooking has been effected, the cans are more violently agitated by operating the mechanism 14 at higher speed and additional heat is applied from a source 11 of superheated steam or the like for a relatively short period of time. The maximum temperature attained during this relatively short sterilizing period may be considerably above the burning temperature of the product, but due to the relatively violent agitation of the material, the material will not burn and substantially all portions of the mass will be subjected to the sterilizing temperature. After sterilization has been effected, the normal cooking temperature is again established in the retort after which the steam is gradually turned off. As the temperature in the retort diminishes a suitable cooling medium such as water or air, is automatically and gradually admitted from a source 12. When the cans have been sufficiently reduced in temperature, the retort discharge door 8 is automatically opened and the cans delivered therefrom by means of the automatic conveying mechanism 6.

In employing the process when preserving canned corn, a maximum cooking temperature of 240 degrees Fahrenheit is found to produce good results, while a sterilizing temperature of 250 degrees Fahrenheit is necessary in order to insure complete sterilization. With this product violent agitation for a considerable length of time should be avoided, in order to prevent extreme disintegration of the material. With product such as peas the agitation may be more violent. In every case the agitation should be such as to produce effective circulation of all portions of the mass of food so as to bring the food portions in contact with the wall of the can. It is also desirable in every case, to establish a sterilizing temperature at least 10 degrees higher than the maximum cooking temperature.

It will be noted that the present process by employing automatic operating and controlling devices in its exploitation, entirely eliminates the human element of former processes, thereby insuring uniform and effective treatment of the product. The momentary increase in temperature above the normal cooking temperature, insures complete sterilization of the product. The cans are not subjected to sudden and local changes in temperature and are thus protected against destruction due to stretching of the seams. By providing a continuous series of retorts and loading and unloading them in succession, the process may be carried on continuously with a resulting enormous capacity. The apparatus capable of exploiting this process is illustrated diagrammatically only and is subject to a wide range of variation in design and construction.

It should be understood that it is not desired to limit the invention to all of the details herein described, for various modifications within the scope of the appended claims, may occur to persons skilled in the art.

It is claimed and desired to secure by Letters Patent:

1. The process of preserving food, which comprises, placing batches of the food into receptacles, completely cooking the food by subjecting the containers to a temperature below the food burning temperature for a relatively long period of time, and subsequently sterilizing the food by simultaneously violently agitating and subjecting the containers to a temperature above the food burning temperature for a relatively short period of time.

2. The process of preserving food, which comprises, placing batches of the food into receptacles and sealing the same, completely cooking the food by subjecting the sealed containers to a temperature below the food burning temperature for a relatively long period of time, and subsequently sterilizing the food by simultaneously violently agitating and subjecting the sealed containers to a temperature above the food burning temperature for a relatively short period of time.

3. The process of preserving food, which comprises, placing batches of the food into receptacles, completely cooking the food by moderately agitating and simultaneously subjecting the containers to a temperature below the food burning temperature for a relatively long period of time, and subsequently sterilizing the food by simultaneously violently agitating and subjecting the containers to a temperature above the food burning temperature for a relatively short period of time.

4. The process of preserving food, which comprises, placing batches of the food into receptacles and sealing the same, completely cooking the food by moderately agitating and simultaneously subjecting the sealed containers to a temperature below the food burning temperature for a relatively long period of time, and subsequently sterilizing the food by simultaneously violently agitating and subjecting the sealed containers to a temperature above the food burning temperature for a relatively short period of time.

5. The process of preserving food, which comprises, sealing the food in a container, cooking the food by subjecting the container for a comparatively long period of time to a temperature, not in excess of 240 degrees Fahrenheit, and subsequently violently agitating the food and subjecting the container to a temperature of at least 250 degrees Fahrenheit for a comparatively short period of time.

6. The process of preserving food, which comprises, sealing the food in a container, subjecting the container to a temperature sufficiently high and for a period of time sufficiently long to cook the food, and subsequently simultaneously violently agitating the food and subjecting the container to a temperature above that which would burn the food if it were not being agitated.

7. The process of preserving food, which comprises, sealing the food in a container, agitating the food and subjecting the container to a temperature sufficiently high and for a period of time sufficiently long to cook the food, and subsequently simultaneously violently agitating the food and subjecting the container to a temperature above that which would burn the food if it were not being agitated.

In testimony whereof, the signature of the inventor is affixed hereto.

OSWALD H. HANSEN.